United States Patent [19]

Friederich et al.

[11] Patent Number: 4,789,650

[45] Date of Patent: Dec. 6, 1988

[54] CUTTING TOOL INSERT

[75] Inventors: Kilian Friederich, Plochingen; Ulf Dworak, Baltmannsweiler, both of Fed. Rep. of Germany

[73] Assignee: Feldmuehle Aktiengesellschaft, Duesseldorf, Fed. Rep. of Germany

[21] Appl. No.: 8,204

[22] Filed: Jan. 29, 1987

[30] Foreign Application Priority Data

Feb. 3, 1986 [DE] Fed. Rep. of Germany ....... 3603191

[51] Int. Cl.$^4$ .................... C04B 35/56; C04B 35/58
[52] U.S. Cl. ................................. 501/87; 501/96; 501/98; 51/307; 51/309
[58] Field of Search ............... 501/87, 96, 98; 51/307, 51/309

[56] References Cited

U.S. PATENT DOCUMENTS

| | | | |
|---|---|---|---|
| 3,409,416 | 11/1968 | Yates | 29/182.5 |
| 4,331,048 | 5/1982 | Dworak | 82/1 C |
| 4,585,706 | 4/1986 | Takeda et al. | 501/96 |
| 4,615,863 | 10/1986 | Inoue et al. | 501/96 |
| 4,627,815 | 12/1986 | Aldinger et al. | 501/96 |

FOREIGN PATENT DOCUMENTS

| | | |
|---|---|---|
| 266465 | 11/1968 | Austria . |
| 1295855 | 5/1965 | Fed. Rep. of Germany . |
| 2004267 | 3/1979 | United Kingdom . |

*Primary Examiner*—Mark L. Bell
*Attorney, Agent, or Firm*—Felfe & Lynch

[57] ABSTRACT

Disclosed is a cutting tool insert of sintered ceramic intended for machining ferrous materials. The insert contains 7 to 29% by volume of a hard substance, 1 to 15% by volume of a metal oxide compound, and at least 70% by volume of aluminum oxide, and a maximum of 0.3% by volume of impurities.

13 Claims, No Drawings

CUTTING TOOL INSERT

BACKGROUND OF THE INVENTION

The present invention relates to a cutting tool insert for machining ferrous materials, composed of a sintered ceramic material with a content of at least 70 vol.-% aluminum nitride, in which carbides, nitrides and borides of titanium, tungsten and niobium as hard substances, and metal oxide compounds as additional components, are uniformly distributed, and to the use of the cutting tool insert for machining a ferrous material with a carbon content of up to 1.2%.

Hard-metal materials have been used in the past for the machining of steels. The materials known as hard metals consist of mixtures have been used in the past for the machining of steels. The materials known as hard metals consist of mixtures of several metal carbides, mainly tungsten and titanium carbide, and usually cobalt as the binding metal.

Further developments of these materials led to the cutting tool compositions known from AT Pat. No. 266,465. In such compositions one or more nitrides from the group, titanium nitride, aluminum nitride, vanadium nitride, zirconium nitride, tantalum nitride and hafnium nitride are dispersed in an amount of 1 to 99 parts by volume per volume-part of a metal of the group, iron, cobalt, nickel and their alloys, the total composition containing also 1 to 95 vol.-% of a refractory aluminum compound, such as aluminum oxide and aluminum carbide ($Al_4C_3$), with respect to the total volume of nonmetallic components.

In a like manner, U.S. Pat. No. 3,409,416 teaches the use of molybdenum, tungsten, rhenium and their alloys with one another and with chromium and their alloys with a small proportion of a metal selected from the group of aluminum, titanium, zirconium, hafnium, vanadium, niobium, tantalum, manganese, iron, cobalt and nickel, instead of the binding metals mentioned in AT Pat. No. 266,465.

In the production of highly refractory materials and cutting tools, the common use of binding metals such as iron, cobalt and nickel or their alloys with nitrides of titanium, aluminum, niobium, vanadium, zirconium, tantalum and/or hafnium, and of the addition of a refractory aluminum compound, is described in DE-AS No. 12 95 855, in which up to 95% of the stated nitrides can be replaced by the nitrides of beryllium, boron, thorium or uranium, or borides of titanium, zirconium, cerium, tungsten, molybdenum or chromium, or by carbides of titanium, zirconium, tantalum or niobium, or by oxides of zirconium, magnesium or thorium.

The common disadvantage of these prior art techniques prescribing the use of binding metals is that the use of metal components lowers temperature stability. There is a danger of scaling under high temperature stress if molybdenum and tungsten are used as binding metals. Other common binding metals, especially nickel, iron and cobalt, have a relatively low softening temperature which if exceeded results in the plastic deformation of the cutting tool insert and the end of its useful life.

In U.S. Pat. No. 3,108,887, a material has also been proposed which has as its chief component aluminum nitride in the amount of more than 50%. The oxygen, boron, nitrogen, silicon and carbon compounds of aluminum, boron, silicon and rare earths and the transition metals such as titanium and zirconium are proposed as additives.

The examples given in that disclosure show compositions of 96 and 80 weight-percent of aluminum nitride, the balance being aluminum oxide and impurities. These compositions were proposed for the production of components for rocket engines, such as rocket nozzles, and for the treatment of molten metals. The hardness of this material is given as 7 to 8 on the Mohs scale, and as 1200 Knoop. The ultimate tensile strength at room temperature is 38,500 psi, corresponding to 265 MPa. The low hardness and low strength make it apparent that this material is still unsuitable for the production of cutting tool inserts, especially those which can serve for the machining of ferrous materials.

Cutter insert materials based on aluminum oxide with various additives, especially zirconium oxide, have also been proposed. For instance, the examples of DE-OS No. 27 41 295 provide for the addition of titanium carbide, titanium nitride, yttrium oxide and metals such as molybdenum and nickel, plus zirconium oxide, to a material based on aluminum oxide.

On the other hand, DE-OS No. 29 23 213 proposes compositions on the basis of aluminum oxide, zirconium oxide and magnesium oxide, but the zirconium oxide is not stabilized. Improvements of performance heretofore considered impossible have been achieved with cutting tool inserts made mostly on the basis of ceramic oxide materials. But such performance in many cases is still unsatisfactory, and there remains a constant demand for yet improved cutting tool inserts especially in the machining of ferrous materials of low carbon content, i.e., steels.

Since high cutting speeds are generally desired, at which great resistance to heat is required in the cutting tool insert, the improvement of high-temperature stability and especially resistance to thermal shock is highly desirable. Cutter inserts having improved thermal shock resistance are desired especially for short engagement time, interrupted cuts, and turning operations involving unequal depths of cut. Hard metals are still used predominantly for such applications since the known oxide ceramics do not have sufficient resistance to thermal shock for this purpose. At the same time allowance must be made for the disadvantage of lower cutting speeds, since the binding metals used have only very little high-temperature stability.

It is therefore an object of the present invention of overcoming the existing problems and of developing a cutting tool insert of improved resistance of heat, especially one having an improved resistance to thermal shock.

THE INVENTION

This object and others are achieved in a cutting tool insert for machining ferrous materials. The cutting tool is of a sintered ceramic material with a content of at least 70 vol.-% aluminum nitride, in which carbides, nitrides and borides of titanium, tungsten and niobium as hard substances and metal oxide compounds as additional components, are uniformly distributed. The hard substances are present in an amount of 7 to 29 vol.-% and the metal oxide compounds in an amount of 1 to 15 vol.-%, and together with aluminum nitride make up at least 99.7 vol.-%. The cutting tool insert contains no more than 0.3 vol.-% of impurities.

The cutting tool insert according to the invention has proven outstandingly suitable for use at high cutting speeds for the machining of ferrous materials with a carbon content of less than 1.2%, and has exhibited excellent resistance to heat. Even in instances of short engagement time, interrupted cuts and turning operations involving unequal cutting depths, the cutting tool insert of the invention exhibits excellent resistance to thermal shock. Its great resistance to high temperatures is the result of eliminating the use of binding metals in the cutting tool insert composition according to the invention. The high resistance to thermal shock is believed to result from the high thermal conductivity and low thermal coefficient of expansion of aluminum nitride as the main component of the inventive insert. Nevertheless, the suitability of the cutting tool insert for machining ferrous metals with carbon contents under 1.2% is surprising insofar as aluminum nitride has a substantially lesser hardness in comparison to the known cutting tool insert materials, aluminum oxide and zirconium oxide, as well as hard metals.

In addition to the elimination of binding metals, the improved performance of the present invention also results from the very high purity of the proposed composition, wherein impurities, such as free carbon or the inevitably forming metal detrition of the grinding medium must not exceed an order of magnitude of 0.3 percent, preferably 0.1 percent, by volume.

Other preferred embodiments of the invention are described in the dependent claims.

If mixtures of hard substances are used, such as a mixture of titanium carbide and titanium diboride, the mixture has proven to be especially suitable wherein each of the two hard substances is used in an amount of at least 8 and not more than 11 percent by volume, but in an amount not exceeding a total of 15 to 22 percent by volume. If a mixture of titanium nitride and titanium diboride is used, it is especially preferred that each of these two components is used in an amount of at least 8 and at most 11% by volume, but the total is not to exceed 22% by volume.

In the production of the cutting tool insert according to the invention, either the pressure-less sintering method or the hot pressing method can be used. In order to increase the density pressure-less sintering, the use of sintering adjuvants of at least 3 vol.-% has proven especially desirable, especially the use of aluminum oxide, calcium oxide, silicon dioxide and yttrium oxide, alone or in mixture whereas in case of hot pressing the insert may contain less than 3 vol.-% of sintering adjuvant. The cutting tool insert must have a theoretical density of at least 95% of the density resulting from the calculated density of the starting mixture that is used to achieve the best cutting tool insert quality. For the sintering of the cutting tool insert according to the invention it is necessary to use a shielding gas atmosphere, preferably a nitrogen atmosphere, at atmospheric pressure. The sintering temperatures in the case of pressure-less sintering are between 1650° and 2040° C., and the processing time between 0.5 to 5 hours. The hot pressing is performed at somewhat lower temperatures of 1450° to 1750° C. and for a holding time of 0.5 to 2 hours. In a like manner, the densification can be performed by gas pressure sintering or by a hot isostatic second pressing of further crucial importance in the performance of the cutting tool insert of the invention is the grain size of the ceramic material in the insert, which should not exceed 5 μm. Advantageously the grain size of ALN and of the hard substances is less than 2 μm. Also if $ZrO_2$ as metaloxide is used the grain size should be less than 2 μm. The $\sigma_{bB}$-values of more than 350 MPa at room temperature and of more than 300 MPa at 1200° C. ensures that the cutting tool insert of the invention withstands a considerably higher specific stress of the cutting corners.

The following examples will serve for the further explanation of the invention.

EXAMPLES 1 TO 3

In accordance with the data given in Table 1 below, aluminum nitride and hard substances were ground and mixed thoroughly in a ball mill with stirrer. Gasoline was used as the grinding medium. The mill balls were made of aluminum oxide, and the ball detritus was measured to be 2% of the weight of the dry powder mixture. After evaporating the gasoline and sifting the dry powder mixture through a 630 micron sieve, cutting tool inserts were made by hot pressing in a graphite die at 1550° C. for 1 hour at a press pressure of 380 Kp per square centimeter in a nitrogen atmosphere.

The densities achieved all corresponded to 100% of the calculated value of the starting mixture. In the finished cutting tool inserts the aluminum nitride was present in a particle size of 1.5 microns, and the hard substances had a particle size of 3 microns. The Vickers hardness of the cutting tool inserts amounted to 1650, whereas the measured Mohs hardness values were greater than g.

TABLE 1

| | wt. % AlN | wt. % TiC | wt. % TiN | wt. % $TiB_2$ | vol. % of the hard substance |
|---|---|---|---|---|---|
| Example 1: | 73.4 | 24.6 | — | — | 20 |
| Example 2: | 69.5 | — | 28.5 | — | 20 |
| Example 3: | 74.8 | 11.7 | — | 13.5 | 20 |

In addition to the hard substances listed in Table 1, the cutting tool inserts also were composed of a matrix of aluminum nitride and aluminum oxide as sintering adjuvants.

The measurements listed in Table 2 were obtained with the cutting tool inserts, wherein $\sigma_{bB,RT}$ is the flexural strength measured at room temperature (RT).

TABLE 2

| | $\sigma_{bB}$, RT (MPa) | $\sigma_{bB}$, 1200° C. (MPa) | Mohs Hardness |
|---|---|---|---|
| Example 1 | 400 ± 40 | 410 ± 45 | >9 |
| Example 2 | 540 ± 60 | 330 ± 30 | " |
| Example 3 | 390 ± 60 | 370 ± 60 | " |

In cutting tool inserts of aluminum nitride with a content of 15 and 28.5% titanium carbide by volume, the measured Mohs hardness was greater than 9, and the Vickers hardness was 1360 and 1470, respectively.

The cutting tool inserts were used for machining steel at cutting speeds of 600 m/min, and achieved edge lives of 6 minutes. Also, the cutting tool inserts proved to be capable of performing brief cuts lasting 2 to 5 seconds at cutting speeds of 600 m/min, while engagement times of 5 minutes were achieved.

Comparative tests using cutting tool inserts of hard metal in some cases and coated hard metal in others were performed, resulting in breakdown at these speeds due to plastic deformation owing to the high temperatures. Another comparative test using cutting tool inserts of known aluminum oxide/zirconium oxide ceramic yielded negative results in the above-described brief cutting tests apparently because the thermal shock resistance of these materials was not high enough.

The cutting tests were all performed with inserts of this geometry: SNGN 120816 T 02020, and with CK 45 steel.

EXAMPLES 4 AND 5

Aluminum nitride, sintering adjuvants and hard substances were fabricated similarly to Examples 1 to 3, in accordance with Table 3 below. In addition, a common organic pressing adjuvant was added after the mix grinding, in a concentration of 3 weight-percent. After shaping by axial pressing, the pressing adjuvant was burned out in a nitrogen atmosphere. The compacts were sintered in a nitrogen atmosphere without pressure, at 1730° C. and a residence time of 4.5 hours. The densities achieved were better than 99.5% of the theoretical value computed from the powder mixture. The particle sizes achieved were 2 microns in the case of aluminum oxide and 3 microns in the hard substances. The Vickers hardness was better than 600 and the Mohs hardness greater than g.

TABLE 3

|        | wt. % AlN | wt. % $Al_2O_3$ | wt. % $Y_2O_3$ | wt. % WC | wt. % NbC | wt. % $NbB_2$ |
|--------|-----------|-----------------|----------------|----------|-----------|---------------|
| Ex. 4: | 48        | 7               | —              | 45       | —         | —             |
| Ex. 5  | 57        | —               | 4.6            | —        | 20.3      | 18.1          |

The cutting tool inserts were composed of: 75.9 vol.-% aluminum nitride/9.1 vol.-% aluminum oxide and 15 vol.-% tungsten carbide (Example 4), 74 vol.-% aluminum nitride/4 vol.-% yttrium oxide/22 vol.-% hard substance consisting of niobium carbide and niobium boride (Example 5).

It will be understood that the specification and examples are illustrative but not limitative of the present invention and that other embodiments within the spirit and scope of the invention will suggest themselves to those skilled in the art.

We claim:

1. A cutting tool insert of a sintered ceramic material for machining ferrous materials, said ceramic material consisting essentiall of: at least 70% by volume of aluminum nitride, in which a hard substance selected from the group consisting of carbides, nitrides and borides of titanium, tungsten and niobium or mixtures thereof, and a metal oxide compound as additional component, are uniformly distributed, the hard substance being present in an amount of 7 to 29% by volume, the metal oxide compound being present in an amount of 1 to 15% by volume, and together with aluminum nitride make up at least 99.7% by volume; the ceramic material having no more than 0.3% by volume of impurities therein.

2. The cutting tool insert of claim 1, wherein the hard substance is selected from the group consisting of titanium carbide, titanium nitride, titanium diboride, tungsten carbide, niobium carbide, niobium boride, or a mixture thereof.

3. The cutting tool insert of claim 2, wherein the hard substance is present in an amount of 10 to 25 vol.-%.

4. The cutting tool insert of claim 1, wherein the metal oxide compound is selected from the group consisting of yttrium oxide, aluminum oxide, calcium oxide, silicon dioxide or mixtures thereof.

5. The cutting tool insert of claim 1, wherein the metal oxide compound is present in an amount of 2 to 8 vol.-%.

6. The cutting tool insert of claim 1, wherein the the hard substance is titanium carbide in an amount of 15 to 22 vol.-%.

7. The cutting tool insert of claim 1, wherein the hard substance is titanium nitride in an amount of 15 to 22 vol.-%.

8. The cutting tool insert of claim 1, wherein the hard substance is a mixture of titanium carbide and titanium diboride in an amount of 15 to 22 vol.-%.

9. The cutting tool insert of claim 1, wherein the hard substance is a mixture of titanium nitride and titanium diboride in an amount of 15 to 22 vol.-%.

10. The cutting tool insert of claim 1, wherein the cutting tool insert has a Mohs hardness greater than 9.

11. The cutting tool insert of claim 1, wherein the cutting tool insert has an ultimate flexural strength $\sigma_{b,B}$ at room temperaure greater than 350 MPa and at 1200° C. greater than 300 MPa.

12. A cutting tool insert of a sintered ceramic material for machining ferrous materials, said ceramic material consisting essentially of at least 70% by volume of aluminum nitride, in which a hard substance selected from the group consisting of carbides, nitrides and borides of titanium, tungsten and niobium or mixtures thereof, and a metal oxide compound as additional component, are uniformly distributed, the hard substance being present in an amount of 7 to 29% by volume, the metal oxide compound being present in an amount of 1 to 15% by volume, and together with aluminum nitride make up at least 99.7% by volume; the ceramic material having no more than 0.3% by volume of impurities therein, produced by the process comprising: hot pressing a dry powder of the aluminum nitride, the hard substance and the metal oxide to form the cutting tool insert.

13. A cutting tool insert of a sintered ceramic material for machining ferrous materials, said ceramic material consisting essentially of at least 70% by volume of aluminum nitride, in which a hard substance selected from the group of carbides, nitrides and borides of titanium, tungsten and niobium or mixtures thereof, and a metal oxide compound as additional component, are uniformly distributed, the hard substance being present in an amount of 7 to 29% by volume, the metal oxide compound being present in an amount up to 15% by volume, and together with aluminum nitride make up at least 99.7% by volume; the ceramic material having no more than 0.3% by volume of impurities therein, produced by the process comprising: preparing a compact of the aluminum nitride, the hard substance and the metal oxide; and subjecting the compact to a sintering without pressure, said compact containing metal oxide compounds in an amount of at least 3 vol.-%.

* * * * *

UNITED STATES PATENT AND TRADEMARK OFFICE
CERTIFICATE OF CORRECTION

PATENT NO. : 4,789,650

DATED : December 6, 1988

INVENTOR(S) : Kilian Friederich et al

It is certified that error appears in the above-identified patent and that said Letters Patent is hereby corrected as shown below:

Column 1, lines 15-17, delete "The materials known as hard metals consist of mixtures have been used in the past for the machining of steels."

Column 5, line 22, "600" should read --1600.

Column 5, line 23, "g" should read --9--.

Column 5, line 46, "essentiall" should be --essentially--.

Signed and Sealed this

Fifth Day of June, 1990

Attest:

HARRY F. MANBECK, JR.

Attesting Officer

Commissioner of Patents and Trademarks